United States Patent
Petrillo et al.

(10) Patent No.: US 6,811,290 B2
(45) Date of Patent: Nov. 2, 2004

(54) FIBEROPTIC ILLUMINATOR

(76) Inventors: Bernard Petrillo, 11 Virginia Rd., N. White Plains, NY (US) 10603; Bruno Israel, 45 Williams St., Kinderhook, NY (US) 12106

( * ) Notice: Subject to any disclaimer, the term of this patent is extended or adjusted under 35 U.S.C. 154(b) by 0 days.

(21) Appl. No.: 10/065,945

(22) Filed: Dec. 3, 2002

(65) Prior Publication Data

US 2004/0105277 A1 Jun. 3, 2004

(51) Int. Cl.[7] ............................................. F21V 33/00
(52) U.S. Cl. ......................... 362/554; 362/575; 385/32
(58) Field of Search ............................... 362/554, 551, 362/572, 575; 385/32, 115, 901

(56) References Cited

U.S. PATENT DOCUMENTS

| | | | | | |
|---|---|---|---|---|---|
| 2,507,909 | A | * | 5/1950 | Kaysen | 362/551 |
| 3,934,148 | A | * | 1/1976 | Collins | 385/32 |
| 4,444,459 | A | * | 4/1984 | Woodwell | 350/96.15 |
| 5,558,422 | A | * | 9/1996 | Sanford | 362/123 |
| 5,878,070 | A | * | 3/1999 | Ho et al. | 372/92 |

* cited by examiner

Primary Examiner—Thomas M. Sember

(57) ABSTRACT

An array of optical fibers are circularly arranged in a horizontal plane to totally encompass an isotropic radiator. This configuration efficiently captures the radiated light and is amenable to a large family of radiators without the need for critical alignment between the radiator and the fiber optic array.

3 Claims, 3 Drawing Sheets

FIBEROPTIC ILLUMINATOR

BACKGROUND OF INVENTION

1. Field of the Invention

The invention relates to need to maximize the light-gathering efficiency and redirection of radiation from omni directional light radiators for the purpose of illuminating specimens for optical analyses.

2. Description of the Prior Art

A family of illuminators, e.g., hot filaments or arc lamps, result in point-source radiators whose radiation patterns are only impeded by inherent mechanical support elements. In many applications, it is desirable to efficiently capture this radiated energy and redirect it along a desired optical axis. Common practice employs the use of reflective assemblies that effectively gather the rearward radiation and refocus this energy in a manner that enhances the forward radiation pattern.

A typical application for this technique is in the field of microscope illumination. The resulting forward radiation pattern is shaped by a collector lens system and ultimately is channeled to the specimen being observed. It is a critical necessity to be able to attain the maximum transfer of light energy from the light source to the specimen.

In a conventional system, the light energy that does not impinge on the reflector or is not on the desired optical axis is wasted to the local environment. The system herein described employs a unique fiber optic bundle that is able to capture a large percentage of this wasted energy and thereby increase the effective amount of light supplied to the specimen.

SUMMARY OF THE INVENTION

It is the object of this invention to provide an omni directional light source system that illuminates specimens fo optical analyses.

It is another object of this invention to provide said illuminator with the ability to efficiently capture and utilize the unused spherical radiations of existing point source radiating systems.

It is a further object of this invention to provide a simple means to attenuate the intensity of the light supplied to the specimens without altering its spectral quality. Supplied.

An advantage of the present invention is that the design of the light-capturing shroud removes the criticality of the positioning of the light source relative to the light-gathering device that is inherently common to reflective/focussing systems.

DETAILED DESCRIPTION

Figure 1:
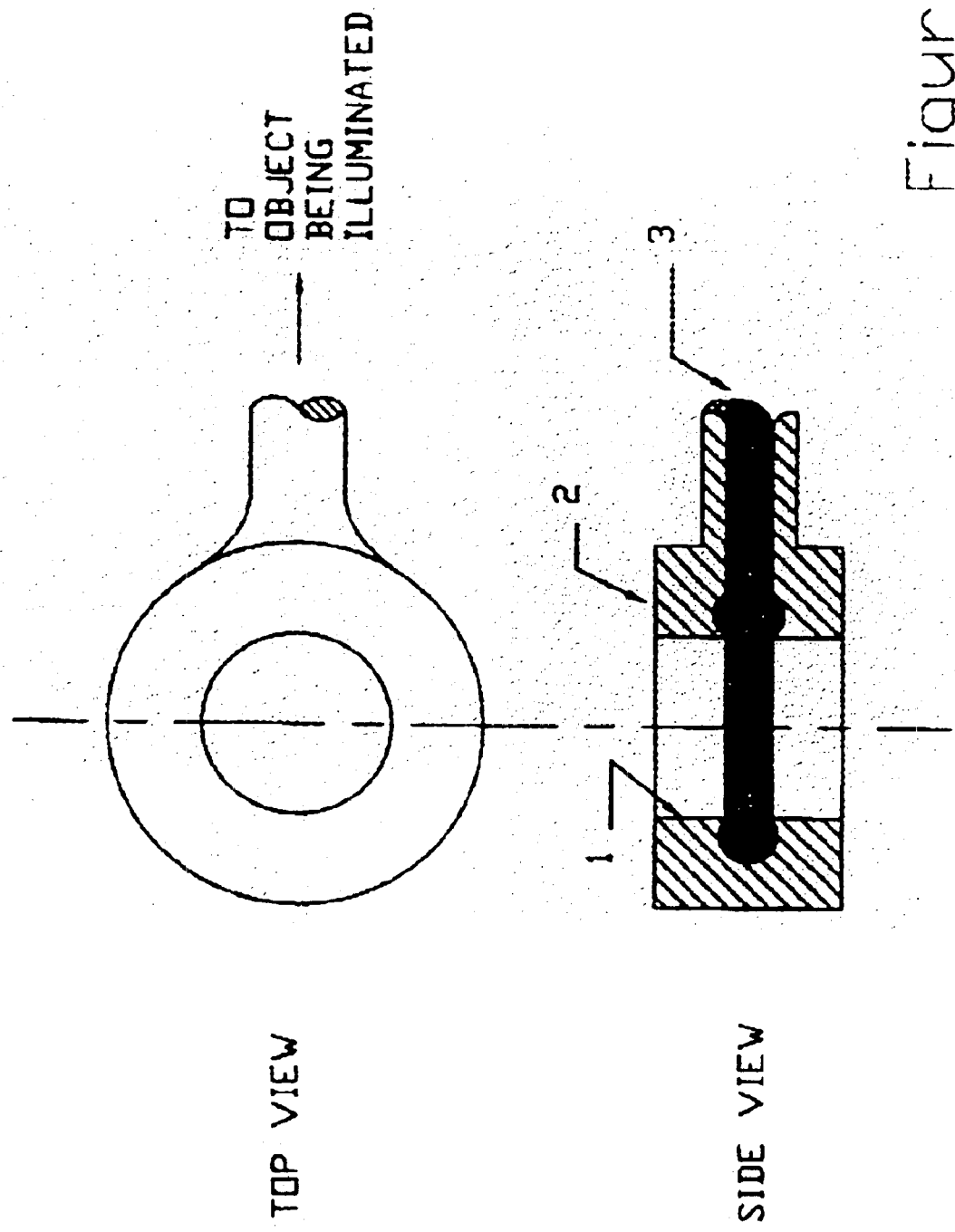
FIG. 1 contains a top and a side view of the fiber optic assembly.

FIG. 1 depicts the structure of the light-capturing device. It consists of an array of optical fibers whose input faces are randomly positioned on the inner surface 1 of a thick-walled cylindrical frame 2. In addition, these fibers are positioned so that their input faces are normal to the vertical axis of the cylinder. The fibers are grouped and formed into a tight circular output bundle 3.

Figure 2:
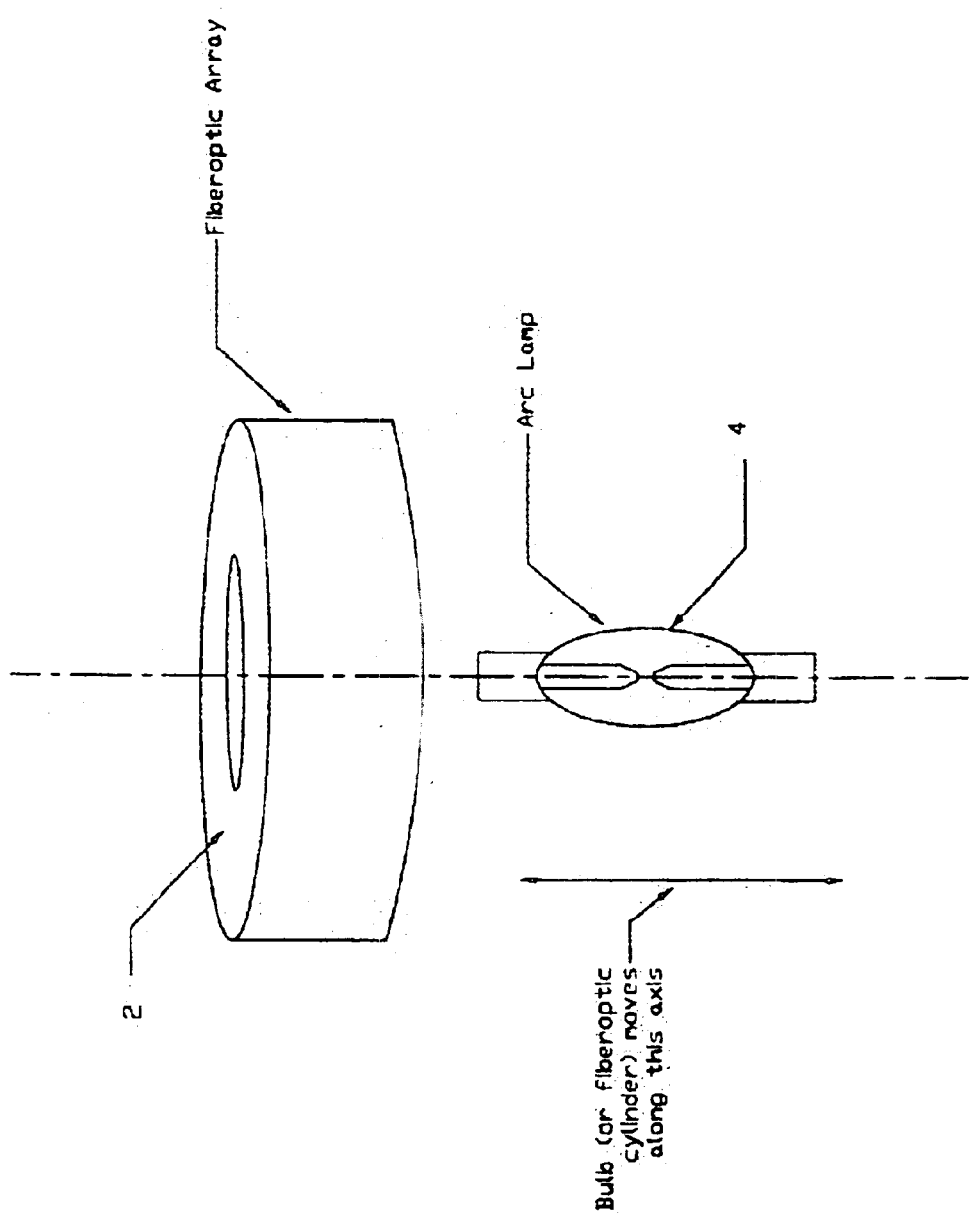
FIG. 2 depicts the vertical movement of the light source relative to the fiber optic assembly.
Figure 3:
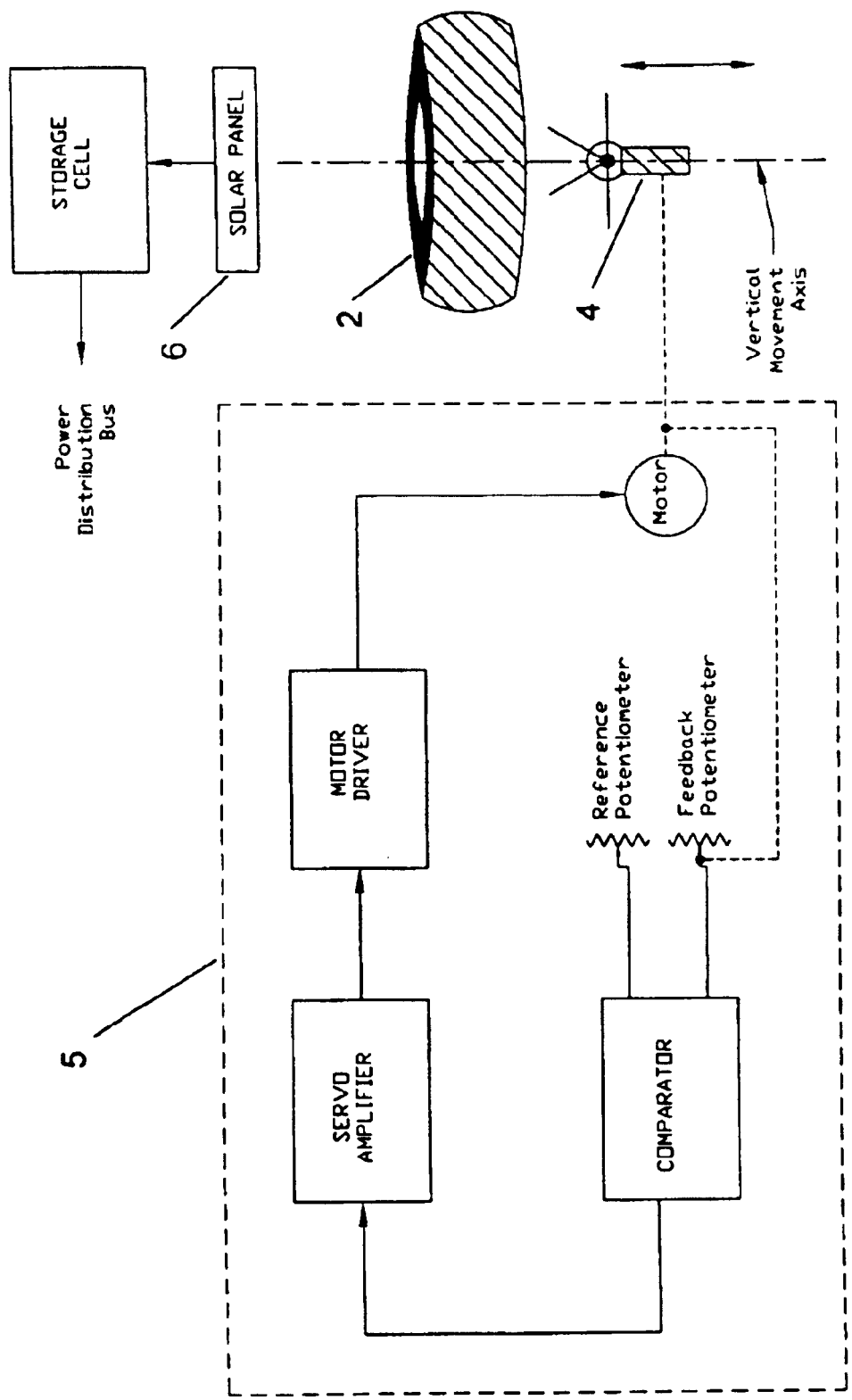
FIG. 3 shows the vertical drive assembly and the optional light-powered energy panel.

FIG. 2 details an arrangement wherein a point source light radiator 4 is placed inside the cylinder 2 on its vertical axis. The vertical dimension of the cylinder has a nominal height that results in a minimum angle of 60 degrees with a horizontal plane through the light source. (A design tradeoff exists between the amount of increased light from a larger capture area and the manufacturing ease and cost of additional optical fibers.) The radiated light energy impinges on the inner surface of the cylinder and is collected by the optical fibers. Conventional optical cable is subsequently employed to conduct the gathered light to illuminate any object of interest.

Various vertical positioning mechanisms can be employed to alter the vertical relationship of the cylinder to the light radiator to achieve any desired light attenuation characteristic.

What is claimed is:

1. a microscope illuminator, comprising;
   a point source light radiator enclosed in a circumferential shroud of multiple optical fibers;
   said optical fibers being recombined to form a tightly-shaped, singular output for illumination of microscope specimens.

2. The microscope illuminator of claim 1, further comprising:
   a vertical positioning system;
   said system capable of altering the relative vertical position between the radiator and the fiber optic shroud to achieve an attenuation control of the transferred energy without altering its spectral characteristics.

3. The microscope illuminator of claim 2, further comprising:
   a solar panel array;
   said array positioned above and/or below the point source radiator;
   so positioned to intercept that portion of the light energy that is not captured by the fiber shroud and to convert this energy into an electrical power source to position the aforementioned drive systems.

* * * * *